Patented Oct. 13, 1953

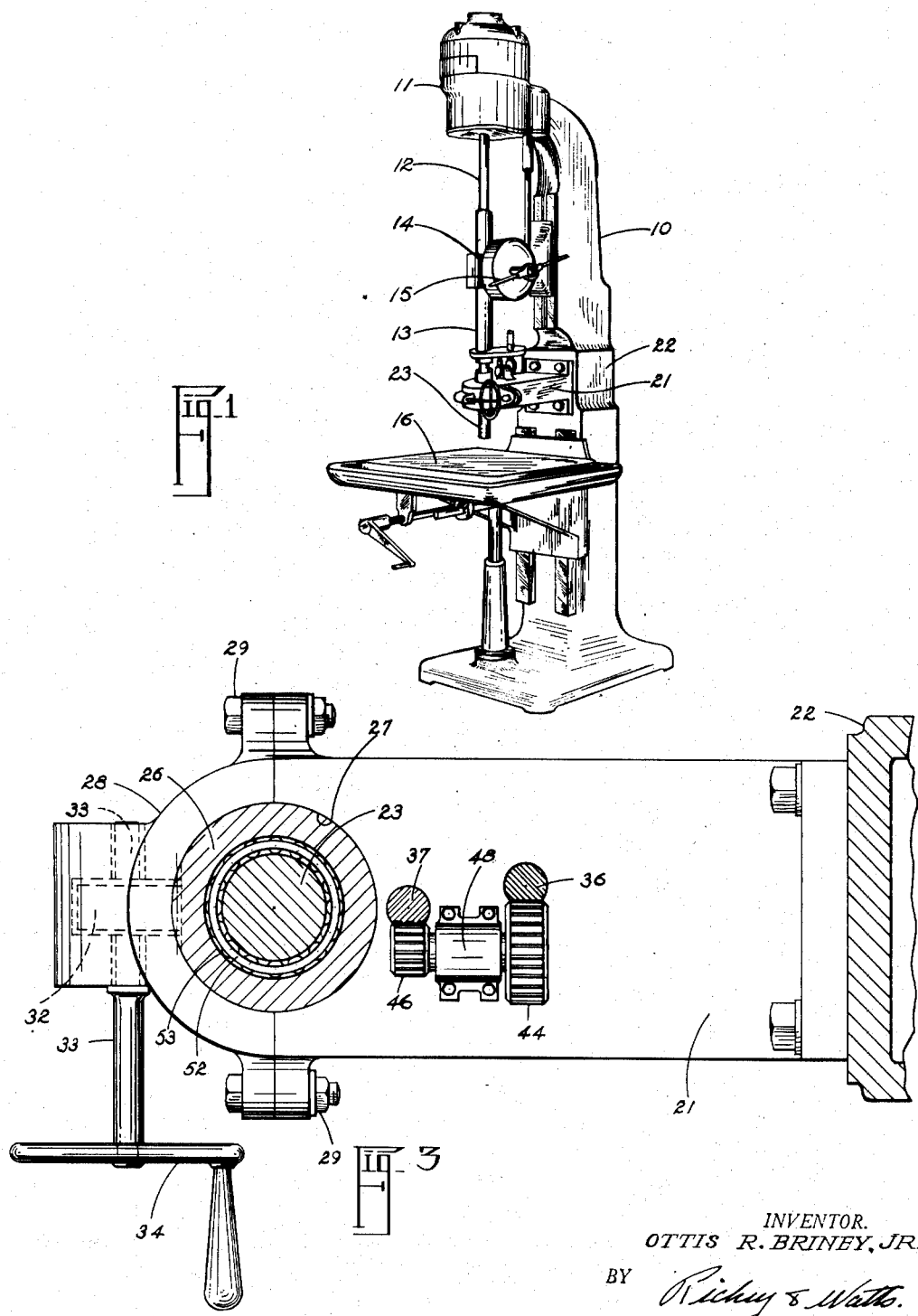

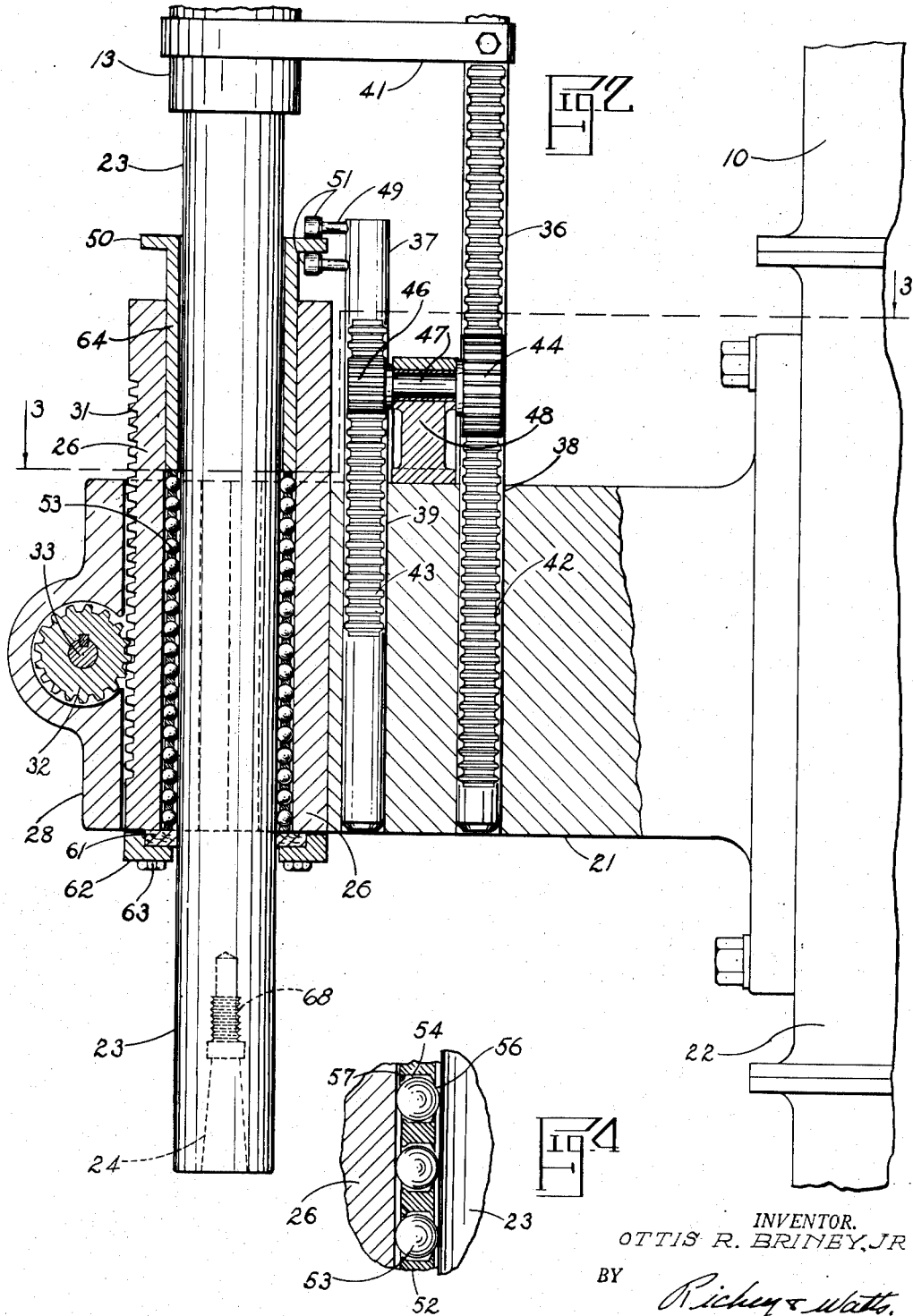

2,655,414

UNITED STATES PATENT OFFICE 2,655,414

MACHINE TOOL SPINDLE

Ottis R. Briney, Jr., Pontiac, Mich., assignor of one-half to James W. Briney

Application October 6, 1948, Serial No. 53,000

3 Claims. (Cl. 308—6)

This invention relates to machine tools, and is particularly directed to improvements in boring machines adapted to take fullest advantage of the desirable qualities of modern extremely hard but fragile cutting alloys, and to prevent damage of tools of this sort resulting from the deleterious effects of vibration or lost motion in the machine.

Another aspect of the invention contemplates a boring device which may be added to existing conventional drill presses to facilitate high-speed precision boring operations and the like which, of course, may be incorporated in new machines.

A still further aspect of the invention is directed to an anti-vibration bearing and guide for a high-speed spindle which will provide for both rotary and axial movement of the spindle while maintaining absolute constancy of position of the spindle axis without vibration or chatter.

In practice, this invention reconciles the incompatible characteristics of the ordinary drill press, which is not a precision machine for boring, with the extreme fragility and lack of resistance to vibration and impact of tools of special alloys, for example, tungsten-carbon-cobalt alloys such as that sold under the trade-mark "Carboloy."

The desirable characteristics of such cutting materials, making possible extremely precise and rapid boring and turning operations, are too well-known to require elaboration. However, it has been found in practice that even tool room precision machine tools have not been suited to the use of such alloys, since vibration and/or backlash in the mechanism have caused the tool to crumble, chip, or break.

As described herein, this invention is embodied in a precision guide for a spindle in a drill press or similar machine which is so precise as to eliminate any shock load on the tool, but which nevertheless turns freely and is entirely suited for operation at high spindle speeds. An important advantage of the invention is that an obsolescent drill press may be converted into the equivalent of a precision jig boring machine adapted to high-speed boring and analogous operations, using tools of special hard alloys.

The principal object of the invention is to provide an improved but simple boring machine.

Another object of the invention is the conversion of drill presses into precision boring machines.

A further object is the improvement of boring spindle mountings.

More specific objects of the invention reside in the provision of an improved ball bearing providing the highest degree of precision while permitting longitudinal as well as rotary motion.

A still further object of the invention is to provide mechanism for maintaining the ball retainer of such a bearing in proper relation to the races.

Other objects and advantages of the invention, more or less ancillary in nature, will be apparent to those skilled in the art from the following description.

Fig. 1 is a view in perspective of a drill press with the preferred embodiment of the invention incorporated therein;

Fig. 2 is an elevation view, partially in section, of the spindle mounting illustrated generally in Fig. 1;

Fig. 3 is a horizontal section of the same on the plane indicated by the line 3—3 in Fig. 2; and Fig. 4 is a detail sectional view of a fragmentary portion of the bearing.

The invention may be incorporated in any conventional type of drill press and in other machines, but for purposes of illustration a known type of drill press is illustrated in Fig. 1. The machine as shown comprises a column 10 at the top of which a power head 11 drives a shaft or spindle 12. The quill 13 is adjustable vertically in a head 14 by a hand-feed lever 15 and by customary power feeds to provide longitudinal feed of the active portion of the spindle. An adjustable table 16 is provided for support of the work.

As is well-known, the ordinary drill press spindle is susceptible to lateral vibration, which is prevented in this invention by the provision of an extension spindle positively and precisely guided, the construction of which is illustrated in Figs. 2 and 3. The invention comprises a bracket 21 which may be mounted in any convenient manner on the column 10 so as to intersect the axis of the spindle 12. The exact manner of mounting is not material; for purposes of illustration, however, cap screws are shown passing through a flange of the bracket into a lifting block 22 secured in the column. Where ways are used for guiding the table 16 or head 15 of the drill press, the bracket 21 may be mounted on either of such ways.

A boring spindle 23, formed with a socket 24 at its lower end to receive a boring tool holder or other cutter, is fitted as an extension of the spindle 12 of the drill press and is supported in the bracket 21. As illustrated, an outer bearing race 26 is clamped in a bore 27 centered at the plane of division between the main body of the bracket 21 and a cap 28 which is retained by bolts and nuts 29. The bearing race 26 is in the form of a sleeve with cylindrical inner and outer surfaces. A longitudinal rack 31 cut in the outer wall of the race is intermeshed with a pinion 32 keyed to a horizontal shaft 33 having a hand wheel 34 mounted thereon. The outer bearing race may thus be adjusted vertically upon loosening the bolts 29.

Rods 36 and 37 are reciprocable in vertical bores 38 and 39 respectively in the bracket 21, the bores being dimensioned to guide the rods throughout the translation of the spindle. The rod 36 is coupled to the non-rotating quill 13 by a tie member 41 so that the rod 36 is reciprocated with the quill as the latter is reciprocated by the hand control 15 or other spindle feed. The rods 36 and 37 are formed with rack teeth 42 and 43 respectively, and are coupled by gears 44 and 46 fixed on a horizontal shaft 47 rotatable in a bearing block 48 fixed to the bracket 21. The gear 44 is of twice the pitch diameter of the gear 46, so that the rod 37 will move in the same direction as the rod 36, but one-half the distance. The rack rod 37 protrudes from the upper surface of the bracket 21 and is fitted, at its upper end, with two horizontal stub shafts 49, each supporting a roller or anti-friction bearing 51.

The spindle 23 is formed with a cylindrical outer surface which forms an inner bearing race cooperating with the outer bearing race 26. A multi-ball bearing, which is interposed between the two races, comprises a bearing separator 52 and a large number of bearing balls 53, each ball being disposed in a radial hole 54 in the separator (Fig. 4). The upper end of the separator 52 extends beyond the outer race and is formed with a flange 50 disposed between the rollers 51.

As the spindle 23 is raised and lowered the separator 52 moves one-half the amount of the movement of the spindle. However, during rotation of the spindle the separator may tend to creep longitudinally if not restrained. Therefore, the rod 37 and rollers 51, which move one-half the amount of movement of the spindle, are always in proper position to support the separator and prevent creeping thereof. It should be understood, however, that the rollers 51 are not required to shift the separator when the spindle is raised or lowered. The balls 53 may be arranged in staggered rows or in a helical pattern to prevent tracking of the balls on the surface of the races. The balls 53 may be held in the separator in any convenient manner. One simple and suitable construction is to form the holes 54 by a drill which does not entirely traverse the thickness of the separator, so that ledges 56 remain at one end of the opening. Then, after the balls are in place, the opposed surface may be upset as indicated at 57 to prevent the balls from dropping out of the cylindrical cage. The bearing comprising the spindle 23, races 26, separator 52, and balls 53 is in some respects similar to that described in my patent entitled "Bearing," No. 2,311,815, issued February 23, 1943.

However, the bearing described in the said patent is of a different character in that it involves a tight or forced fit between the bearing balls and the races, the preferred application of such structure being directed to a relatively slow-moving spindle on which a member was mounted for the purpose of grinding threads.

I have found that employing a fit with no clearance but reducing the compression of the balls and races inherent in the forced fit of the said patent makes a bearing more suitable for high-speed operation and does not permit side play. In the bearing disclosed herein, the diameter of the balls is preferably equal to the difference in radii of the races.

In the present invention the length of the bearing is substantially three times the diameter of the spindle, hence a very rigid bearing proof against any lateral vibration may be had without assembly of the bearing balls in press-fit engagement with the races. In order to eliminate play in the bearing, however, the inner and outer races must be hardened, ground, and lapped to a precision of the order of one or two ten-thousandths of an inch. With a bearing of this character the spindle is always free to rotate irrespective the expansion of assembly due to heat generated by the action of the cutting tool.

The spindle bearing is protected against the entrance of foreign matter by a sealing ring 61 of felt or similar material clamped between the lower end of the outer race and a retaining ring 62 by screws 63. The upper portion 64 of the ball separator is preferably machined for a running fit in its bearing in order to prevent lateral movement thereof and also preclude the entry of foreign matter to the bearing surfaces. The separator cage or shell is formed with suitable clearance to prevent engagement thereof with the ball races.

If it is desired to shift the outer bearing race vertically from the position illustrated in Fig. 2, the clamping bolts 29 may be loosened and the bearing shifted by means of the hand wheel 34. When such adjustment is made the outer race will traverse the bearing balls 53 and the tie member 41 is released to accommodate the simultaneous adjustment of the separator 52.

The exact form of the tool socket 24 is immaterial to the present invention except that the arrangement must be such as to hold the tool securely and rigidly and must, of course, not interefere with the bearing race portion of the outer surface of the spindle. The socket illustrated includes a threaded portion 68 to assure the intimate engagement of he shank of the tool in the spindle socket. With this structure the tool may be removed by unscrewing the holder from the spindle.

While the provision of a raising block 22 as indicated in the drawings is not an essential feature of the invention, it may be desirable when fitting the invention to pre-existing drill presses in order to provide room for the invention and leave the desired amount of clearance between the spindle 23 and the work table 16. The tie member 41 may be adjustably clamped to the quill 13 in any convenient manner.

Actual operation of machines incorporating the invention has conclusively shown that there is no observable sidewise play or looseness in the bearing and has shown further that entirely satisfactory operation with fragile hard alloy tools of the type referred to above is entirely feasible with a machine of the character disclosed in this application.

The preferred embodiment of the invention has been disclosed as required by the patent laws. It will be understood, however, that the invention is capable of various modifications and is useful in many situations. The detailed description of the preferred embodiment is therefore not to be construed as a limitation of the scope of the invention, which is to be determined from the appended claims.

I claim:

1. In combination with a machine tool embodying a rotatable axially movable spindle, an anti-friction bearing therefor comprising a bored member constituting an outer ball race, a ball separator mounted for axial movement therein, a plurality of balls supported in said separator and engaging said bored member and said spindle, a bar mounted in the machine tool for reciprocative movement parallel to the axis of said spindle, supporting means on said bar engaging with said separator, and means associated with the bar and with the spindle to control the reciprocative movement of said separator.

2. In a metal working machine, a high speed rotating spindle, a support body, the spindle being mounted in the body for reciprocation along the spindle axis, anti-friction bearing means comprising a cylindrical separator between the spindle and body, and a number of circumferential rows of bearing balls guided by the separator, the inner surface of the body and the outer surface of the spindle constituting cylindrical bearing races for the balls, control means for positioning the separator relative to the body including a first reciprocable rack operably connected to the spindle and a second reciprocable rack operably joined to the separator, a pair of pinions on a shaft mounted for rotation on the body and in engagement with each of the racks respectively, the pinions and racks having gear ratios which provide for the separator to be controlled to move one-half the travel of the spindle.

3. In a metal working machine, a high speed rotating spindle, a support body, the spindle being mounted in the body for reciprocation along the spindle axis, anti-friction bearing means comprising a cylindrical separator between the spindle and body, and a number of circumferential rows of bearing balls guided by the separator, the inner surface of the body and the outer surface of the spindle constituting cylindrical bearing races for the balls, control means for positioning the separator relative to the body including a first reciprocable rack operably connected to the spindle and a second reciprocable rack operably joined to the separator, a pair of pinions on a shaft mounted for rotation on the body and in engagement with each of the racks respectively, the pinion operating with the first rack having twice the number of teeth as the pinion operating with the second rack whereby the separator is controlled to move one-half the travel of the spindle.

OTTIS R. BRINEY, Jr.

References Cited in the file of this patent

UNITED STATES PATENTS

| Number | Name | Date |
|---|---|---|
| 162,652 | Hoe | Apr. 27, 1875 |
| 819,270 | Fox | May 1, 1906 |
| 2,025,721 | Broulhut | Dec. 31, 1935 |
| 2,311,815 | Briney | Feb. 23, 1943 |